United States Patent
Bak et al.

(10) Patent No.: US 11,573,906 B2
(45) Date of Patent: Feb. 7, 2023

(54) FASTER COMPUTER MEMORY ACCESS BY REDUCING SLAT FRAGMENTATION

(71) Applicant: Microsoft Technology Licensing, LLC, Redmond, WA (US)

(72) Inventors: Yevgeniy Bak, Redmond, WA (US); Mehmet Iyigun, Krikland, WA (US); Jonathan E. Lange, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/157,678

(22) Filed: Jan. 25, 2021

(65) Prior Publication Data

US 2021/0149816 A1    May 20, 2021

Related U.S. Application Data

(62) Division of application No. 16/198,620, filed on Nov. 21, 2018, now Pat. No. 10,901,911.

(51) Int. Cl.
*G06F 12/10*     (2016.01)
*G06F 12/1009*   (2016.01)
*G06F 9/455*     (2018.01)

(52) U.S. Cl.
CPC ...... *G06F 12/1009* (2013.01); *G06F 9/45558* (2013.01); *G06F 2009/45583* (2013.01); *G06F 2212/1024* (2013.01); *G06F 2212/657* (2013.01)

(58) Field of Classification Search
CPC ........... G06F 12/1009; G06F 2212/657
See application file for complete search history.

(56) References Cited

U.S. PATENT DOCUMENTS

2006/0206687 A1*  9/2006  Vega ............... G06F 12/145
                                                          711/6
2009/0182976 A1*  7/2009  Agesen ........... G06F 12/1009
                                                      711/E12.059

(Continued)

FOREIGN PATENT DOCUMENTS

RU    2550558 C2   5/2015
RU    2571366 C2   12/2015

OTHER PUBLICATIONS

"Office Action Issued in Russian Patent Application No. 2021117704", dated Mar. 23, 2022, 11 Pages.

(Continued)

*Primary Examiner* — David E Martinez

(57) ABSTRACT

To increase the speed with which a Second Layer Address Table (SLAT) is traversed, memory having the same access permissions is contiguously arranged such that one or more hierarchical levels of the SLAT need not be referenced, thereby resulting in more efficient SLAT traversal. "Slabs" of memory are established whose memory range is sufficiently large that reference to a hierarchically lower level table can be skipped and a hierarchically higher level table's entries can directly identify relevant memory addresses. Such slabs are aligned to avoid smaller intermediate memory ranges. The loading of code or data into memory is performed based on a next available memory location within a slab having equivalent access permissions, or, if such a slab is not available, or if an existing slab does not have a sufficient quantity of available memory remaining, a new slab with the proper access permissions is established.

20 Claims, 6 Drawing Sheets

(56) References Cited

U.S. PATENT DOCUMENTS

2014/0040529 A1* 2/2014 Grisenthwaite ..... G06F 12/1009
711/6
2017/0308484 A1* 10/2017 Lutas ..................... G06F 21/53
2019/0018746 A1* 1/2019 Haid .................... G06F 9/4418

OTHER PUBLICATIONS

"Notice of Allowance Issued in South African Patent Application No. 2021/02321", dated Apr. 20, 2022, 1 Page.
"Notice of Allowance Issued in Russian Patent Application No. 2021117704", dated Aug. 4, 2022, 25 Pages.

* cited by examiner

FASTER COMPUTER MEMORY ACCESS BY REDUCING SLAT FRAGMENTATION

CROSS-REFERENCE TO RELATED APPLICATION

This application is a divisional of, and claims priority to, U.S. patent application Ser. No. 16/198,620, filed on Nov. 21, 2018 and entitled "FASTER COMPUTER MEMORY ACCESS BY REDUCING SLAT FRAGMENTATION", the entire specification of which is hereby incorporated by reference.

BACKGROUND

Modern computing devices operate by executing computer-executable instructions from high-speed volatile memory in the form of random access memory (RAM), and the execution of such computer executable instructions often entails the reading of data from RAM. Due to cost, physical size limitations, power requirements, and other like constraints, computing devices typically comprise less RAM than is required by the processes that are typically executed on such computing devices. To accommodate such constraints, virtual memory is utilized, whereby the memory that appears to be available to processes executing on a computing device is greater than the physical memory circuitry provides for. The relationship between virtual memory and physical memory is typically managed by one or more memory managers, which implement, maintain, and/or reference a "page table" whose information delineates the relationship between one or more virtual memory addresses and the locations of corresponding data, either in physical memory, or on some form of storage media. To accommodate the quantities of memory relevant to modern computing devices and the processes executed thereon, a modern page table is typically comprised of multiple hierarchical levels of tables, with a hierarchically higher level table having entries that each identify a different hierarchically lower level table, and with the hierarchically lowest level table comprising entries that do not identify a still further table, but rather identify the memory addresses themselves.

Among the processes that can be executed by computing devices are virtual machines, which can simulate underlying computing hardware to processes executed within the context of such virtual machines. The virtualization of host computing hardware is typically performed by a hypervisor, or similar set of computer-executable instructions. A hypervisor can maintain a Second Layer Address Table (SLAT) which can, in a manner analogous to the aforementioned page tables, maintain information that delineates the relationship between one or more memory addresses that appeared to be physical memory locations to processes executing within the context of a virtual machine, and the memory locations of actual physical memory itself.

When a process executing within the context of a virtual machine accesses memory, two different page table lookups can be performed. One page table lookup can be to identify a physical memory address, as perceived processes executing within the context of the virtual machine, which corresponds to the virtual memory address, within the context of the virtual machine, that was accessed by the process executing within the context of the virtual machine. Such a lookup can be performed by a memory manager executing within the context of the virtual machine and can be made with reference to a page table that exists within the context of the virtual machine. A second page table lookup can then identify an actual physical memory address that corresponds to the memory address that was perceived as a physical memory address by processes executing within the context of the virtual machine, and which was the result of the prior page table lookup. Such a second lookup can entail one or more processing units of the computing device referencing the SLAT.

Like the page table maintained by the memory manager within the context of the virtual machine, the SLAT can be a hierarchical arrangement of different hierarchical levels of tables. The performance of a page table lookup, whether performed by the memory manager, with reference to the page table, in the context of the virtual machine, or whether performed by the hypervisor, with reference to the SLAT, can entail determining an appropriate table entry within a highest hierarchical table level, referencing a hierarchically lower level table that is identified by that table entry, determining an appropriate table entry within that hierarchically lower level table, referencing a hierarchically still lower level table that is identified by that table entry, and so on, until a lowest hierarchical level table is reached, whereupon the individual entries of that table identify one or more specific addresses, or ranges of addresses, of memory itself, as supposed to identifying a still further table. Each reference to a hierarchically lower level table consumes processor cycles and increases the duration of a memory access.

In the case of a memory access from a process executing within the context of a virtual machine, the duration of such a memory access can include both the lookup performed by the memory manager, with reference to the page table, in the context of the virtual machine, and, in addition, the lookup performed by the hypervisor, with reference to the SLAT. The additional delay introduced by the lookup performed by the hypervisor, with reference to the SLAT, renders memory access from processes executing within the context of a virtual machine more inefficient as compared with processes executing outside the context of the virtual machine. Such inefficiencies can discourage users from utilizing virtual machines and achieving the security benefits, and other benefits conferred by executing within the context of a virtual machine.

SUMMARY

To increase the speed with which the hierarchical levels of a Second Layer Address Table (SLAT) are traversed as part of a memory access from within a virtual machine, memory having the same access permissions can be contiguously arranged such that one or more hierarchical levels of tables within the SLAT need not be referenced, thereby resulting in more efficient SLAT traversal and more efficient memory access from processes executing within the context of a virtual machine. More specifically, "slabs" of memory can be established, with each slab being a contiguous set of memory having a specified and unvarying set of memory access permissions across the entire contiguous set, and with the contiguous set of memory being sufficiently large that table entries of a hierarchical level of the SLAT can identify the memory addresses directly instead of identifying still further hierarchically lower level tables of the SLAT. Because the memory addresses of such slabs can be directly identified by a hierarchically higher level table of the SLAT, reference to hierarchically lower level table of the SLAT need not be performed and can be skipped, resulting in a faster SLAT traversal and, correspondingly, faster memory access. Such slabs can be further aligned to avoid smaller intermediate memory ranges between slabs. The loading of code or data into memory can then be performed based on a next available memory location within a slab having equivalent access permissions, or, if such a slab is not available, or if an existing slab does not have a sufficient quantity of available memory remaining, a new slab with the proper access permissions can be established. If access permissions of code or data being loaded into memory are unknown, default permissions can be utilized. If the permissions that are ultimately set differ from those initially expected, the location at which code or data was loaded into memory can be changed such that the code or data is loaded into memory that is part of a slab having equivalent access permissions to those now assigned to the memory into which the code or data was loaded.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
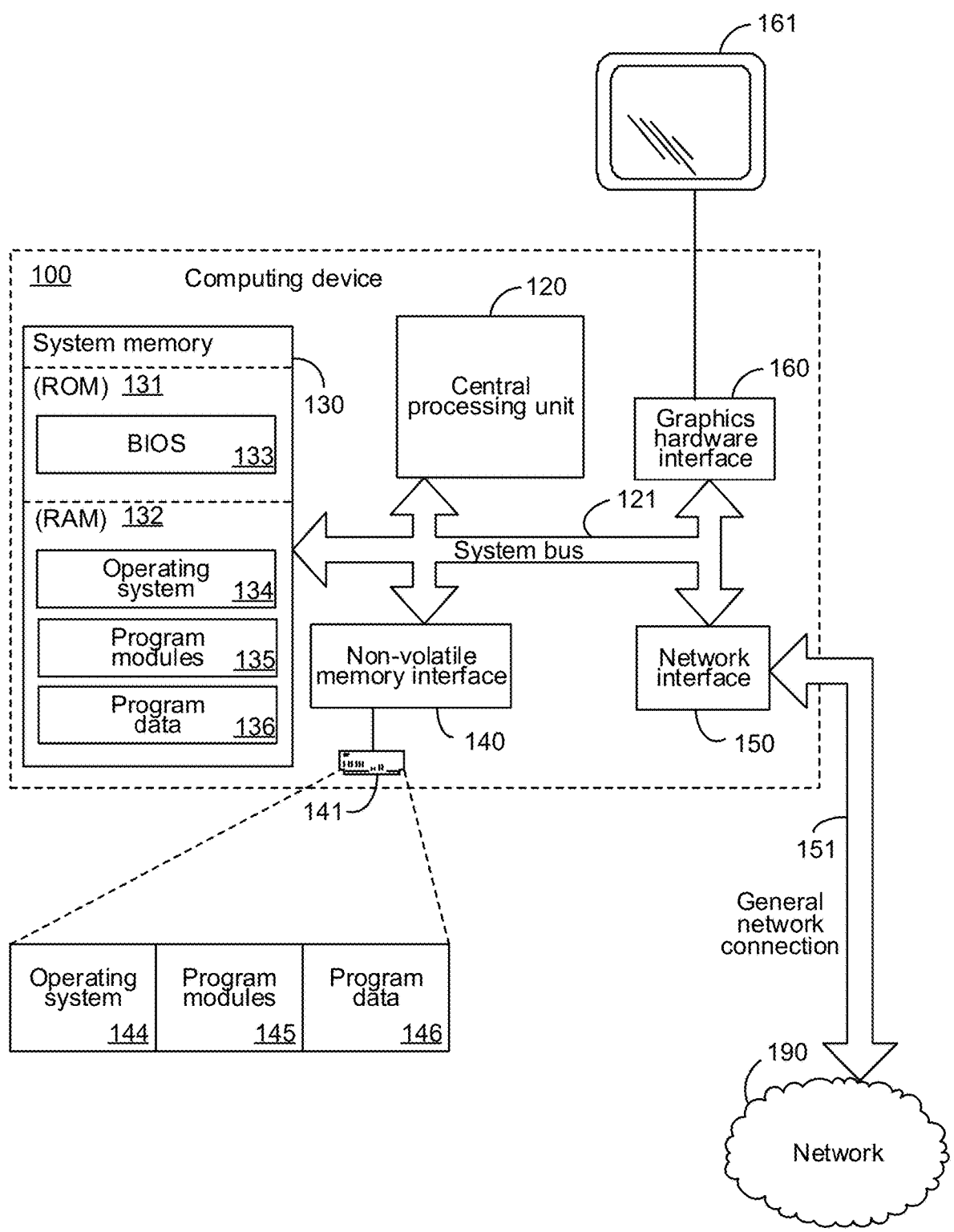
FIG. 1 is a block diagram of an exemplary computing device

The following description relates to increasing the efficiency of memory access from within a virtual computing environment. To increase the speed with which the hierarchical levels of a Second Layer Address Table (SLAT) are traversed as part of a memory access from within a virtual machine, memory having the same access permissions can be contiguously arranged such that one or more hierarchical levels of tables within the SLAT need not be referenced, thereby resulting in more efficient SLAT traversal and more efficient memory access from processes executing within the context of a virtual machine. More specifically, "slabs" of memory can be established, with each slab being a contiguous set of memory having a specified and unvarying set of memory access permissions across the entire contiguous set, and with the contiguous set of memory being sufficiently large that table entries of a hierarchical level of the SLAT can identify the memory addresses directly instead of identifying still further hierarchically lower level tables of the SLAT. Because the memory addresses of such slabs can be directly identified by a hierarchically higher level table of the SLAT, reference to hierarchically lower level table of the SLAT need not be performed and can be skipped, resulting in a faster SLAT traversal and, correspondingly, faster memory access. Such slabs can be further aligned to avoid smaller intermediate memory ranges between slabs. The loading of code or data into memory can then be performed based on a next available memory location within a slab having equivalent access permissions, or, if such a slab is not available, or if an existing slab does not have a sufficient quantity of available memory remaining, a new slab with the proper access permissions can be established. If access permissions of code or data being loaded into memory are unknown, default permissions can be utilized. If the permissions that are ultimately set differ from those initially expected, the location at which code or data was loaded into memory can be changed such that the code or data is loaded into memory that is part of a slab having equivalent access permissions to those now assigned to the memory into which the code or data was loaded.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Before proceeding with a detailed description of the memory allocation and access mechanisms referenced above, a detailed description of an exemplary computing device, which provides context for the descriptions below, is provided with reference to the exemplary computing device 100 shown in FIG. 1. The exemplary computing device 100 can include, but is not limited to, one or more central processing units (CPUs) 120, a system memory 130, and a system bus 121 that couples various system components including the system memory to the processing unit 120.

The system bus 121 may be any of several types of bus structures including a memory bus or memory controller, a peripheral bus, and a local bus using any of a variety of bus architectures. The computing device 100 can optionally include graphics hardware, including, but not limited to, a graphics hardware interface 160 and a display device 161, which can include display devices capable of receiving touch-based user input, such as a touch-sensitive, or multi-touch capable, display device. Depending on the specific physical implementation, one or more of the CPUs 120, the system memory 130 and other components of the computing device 100 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 100. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer content between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 141 is typically connected to the system bus 121 through a non-volatile memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 may operate in a networked environment using logical connections to one or more remote computers. The computing device 100 is illustrated as being connected to the general network connection 151 (to a network 190) through a network interface or adapter 150, which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 161. It will be appreciated that the network connections shown are the exemplary and other means of establishing a communications link between computing devices may be used.

Although described as a single physical device, the exemplary computing device 100 can be a virtual computing device, in which case the functionality of the above-described physical components, such as the CPU 120, the system memory 130, the network interface 160, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 100 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

Figure 2:
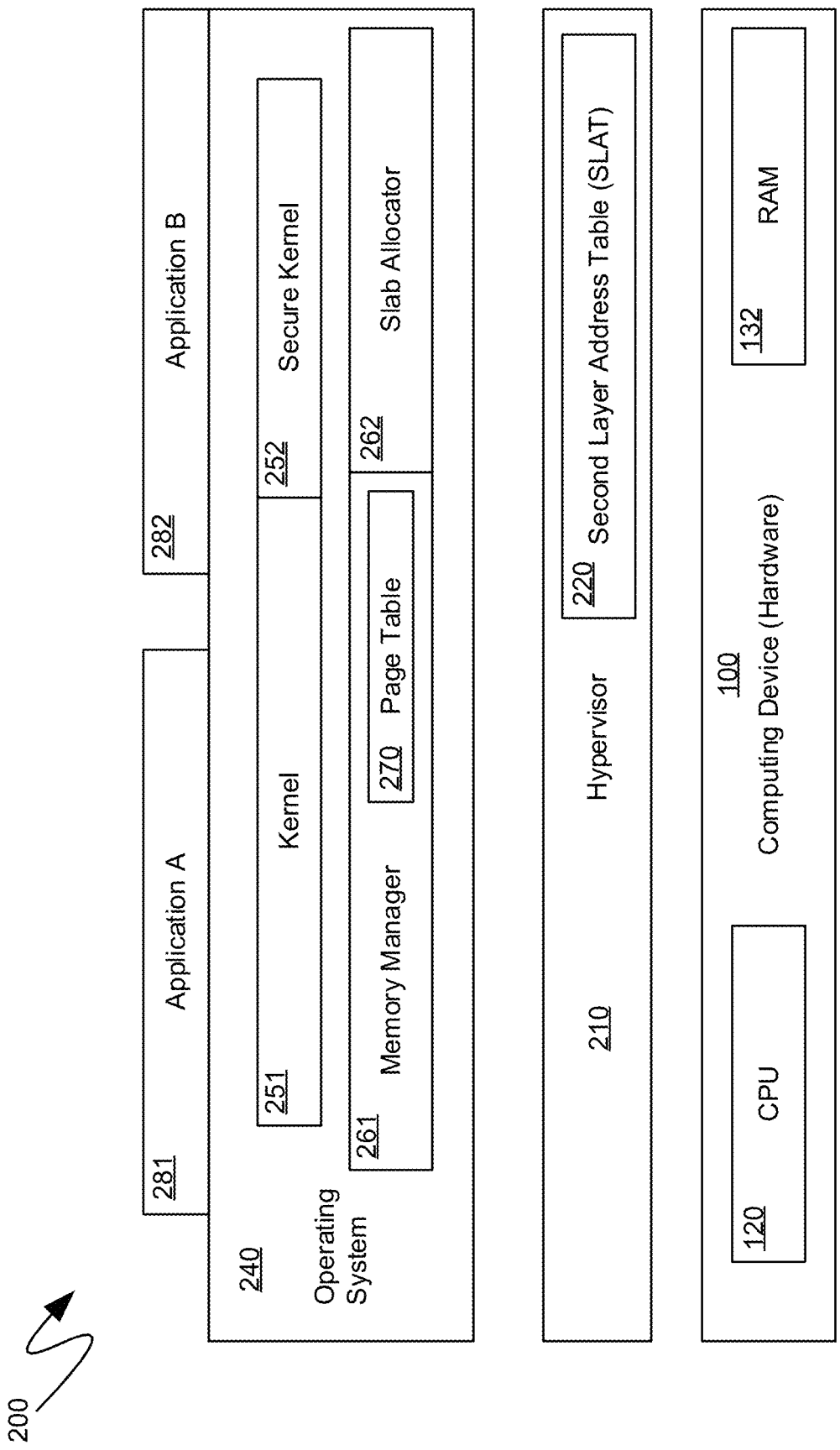
FIG. 2 is a system diagram of an exemplary hardware and software computing system.

Turning to FIG. 2, the system 200 shown therein illustrates a computing system comprising both a computing device in the form of computing device hardware, and processes being executed by such a computing device. More specifically, the exemplary system 200 shown in FIG. 2 includes computing device hardware itself, such as the aforementioned processing units 120 and RAM 132, illustrated as part of the aforedescribed the exemplary computing device 100. Additionally, the exemplary system 200 includes a hypervisor, such as the exemplary hypervisor 210, which can be comprised of computer executable instructions that are executed by the exemplary computing device 100 to enable the computing device 100 to perform the functionality associated with the exemplary hypervisor 210. As will be described in further detail below, the exemplary hypervisor 210 can include, or can reference, a Second Layer Address Table (SLAT), such as the exemplary SLAT 220.

The exemplary hypervisor 210 can virtualize a set of computing hardware that can either be commensurate with the hardware of the computing device 100, or which can differ therefrom, including differences in processor type and/or capacity, differences in quantity and/or type of RAM, differences in quantity and/or type of storage media, and other like differences. Such virtualization can enable one or more virtual machine processes to execute on top of the exemplary hypervisor 210 and present, to processes executing on top of the exemplary hypervisor 210, the appearance of executing directly on the computing device hardware 110. The exemplary system 200 shown in FIG. 2 illustrates one such virtual machine process, in the form of the exemplary virtual machine 230. The exemplary virtual machine 230 can have executing thereon an operating system, such as the exemplary operating system 240. In turn, as illustrated by the exemplary system 200, the exemplary operating system 240 can have executing thereon one or more computer executable application programs, such as in the form of the exemplary application program process 281 and the exemplary application program process 282.

The exemplary operating system 240 can comprise various components, subcomponents, or aspects thereof that are relevant to the descriptions below. While illustrated as visually distinct elements in FIG. 2, such a visual depiction is not meant to convey a specific computational independence, such as process boundaries, independent memory silos, or other like computational delineations. One aspect of the operating system 240 can be a kernel, such as the exemplary kernel 251, which can, among the performance of other actions, trigger the loading of other components, plug-ins, drivers, or other like aspects of the operating system 240. The loading of computer-executable instructions, in the form of code, and computer-readable data can be performed buy a memory manager, such as the exemplary memory manager 261. More specifically, the exemplary memory manager 261 can read code or data from one or more computer readable storage media and copy such code or data into memory, which can be supported by the RAM 132.

The virtual machine 230 can support virtual memory in the same manner that an operating system executing directly on the computing device hardware 100 could support virtual memory. As utilized herein, the term "virtual memory" is not made with reference to the virtual machine 230, but rather to the concept of presenting to application programs, or other processes executing on a computing device, the appearance of having access to a greater quantity of memory than is physically present in the RAM 132. Thus, for example, processes executing on top of the operating system 240 can be allowed to load code and/or data into virtual memory that is, ultimately, supported by physical memory but whose quantity is larger than the physical memory. The memory manager 261, executing on top of the operating system 240 can maintain, modify, and/or utilize the page table 270 account for the correlation between one or more virtual memory addresses and one or more physical memory addresses. More specifically, the page table 270 provides address translation between one memory addressing scheme and another, different memory addressing scheme. Thus, the page table 270 can comprise multiple hierarchical levels of tables, described in further detail below, that can correlate one or more memory addresses according to one memory addressing scheme, namely virtual memory addresses, to one or more memory addresses according to another, different memory addressing scheme, namely physical memory addresses, or, more specifically, addresses that processes executing on top of the operating system 240, including the memory manager 261, can perceive as physical memory addresses. The hypervisor 210, in facilitating the presentation of a virtual set of computing hardware, can translate the memory addresses that were perceived by processes executing on top of the operating system 240 as being physical memory addresses into actual physical memory addresses. Such a translation can be performed with reference to another page table, namely the SLAT 220, which can also provide for memory address translation between one memory addressing scheme, in this case addresses that are perceived by processes executing within the virtual machine 230 as being physical memory addresses, and another, different memory addressing scheme, namely, in this case, actual physical memory addresses.

Figure 3:
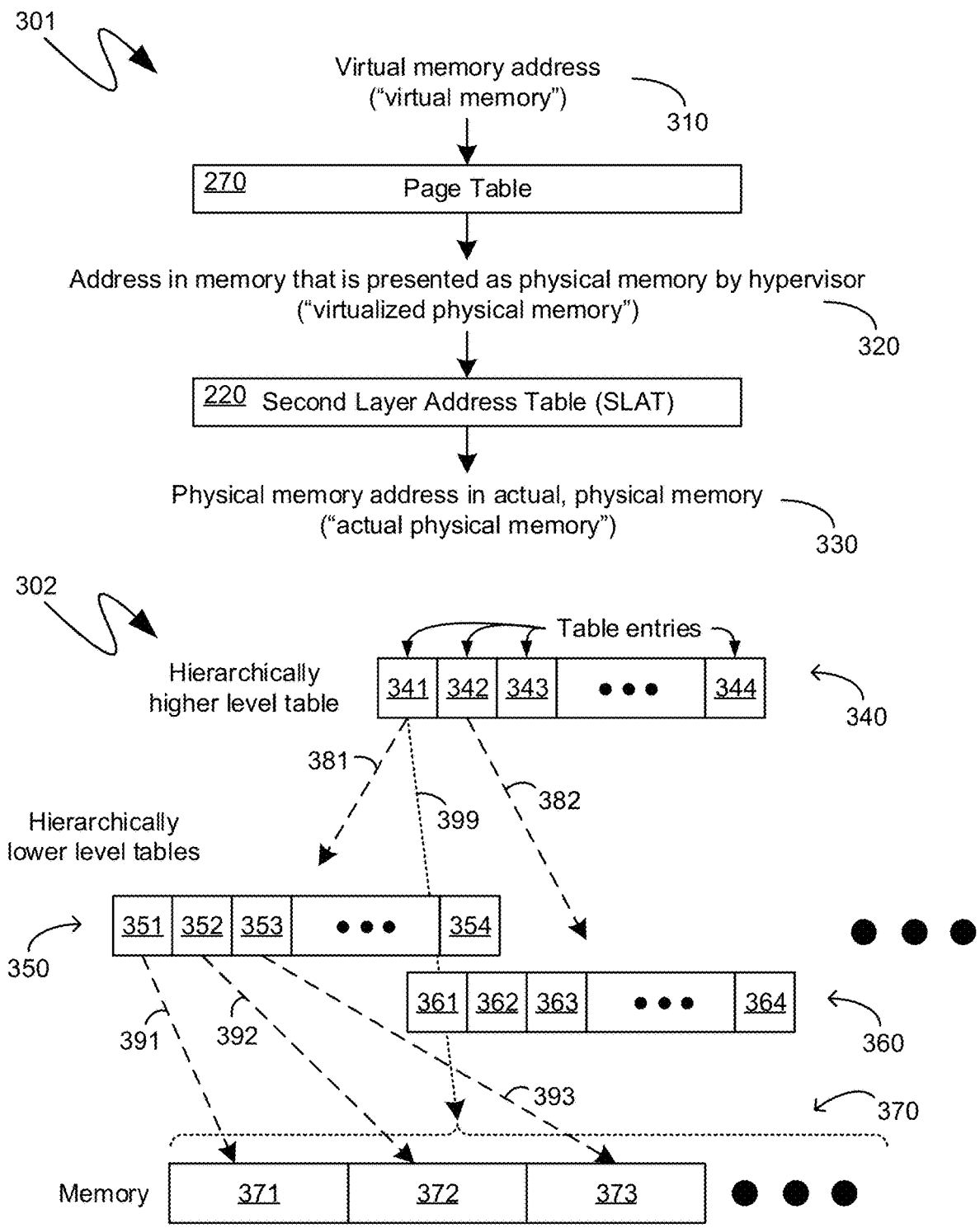
FIG. 3 is a block diagram illustrating terminology utilized herein.

Turning to FIG. 3, system 301 illustrates the terminology utilized herein to refer to the multiple levels of page tables and corresponding memory addressing schemes that are applicable to the system 200 shown in FIG. 2. More specifically, and as illustrated in FIG. 3, within the context of a virtual computing environment provided by a virtual machine, a memory manager can reference page tables, such as the exemplary page table 270, to correlate virtual memory addresses to physical memory addresses. However, and as indicated previously, because such a correlation is performed within the context of a virtual computing environment, the physical memory addresses are only physical memory addresses as perceived by processes executing within the virtual computing environment, and are not actual physical memory addresses. As also indicated previously, the term "virtual memory" does not refer to memory within a virtual computing environment, but rather to an amount of memory made available to processes executing on a computing device that is supported by, but is larger than, the capacity of physical memory. For ease of reference, and as illustrated in system 301, virtual memory addresses within the context of a virtual computing environment will be referred to as "virtualized virtual memory" 310. Similarly, memory addresses that are only perceived, by processes executing within the context of a virtual computing environment, to be physical memory addresses will be referred to as "virtualized physical memory" 320. Memory that refers to actual physical locations, such as on chips or other like RAM semiconductor devices, will be referred to as "actual physical memory" 330.

The system 302, shown in FIG. 3, illustrates a hierarchical arrangement of tables such as can be utilized to implement the page table 270 and the SLAT 220. To accommodate quantities of memory applicable to modern computing devices and application program processes, the page table 270 and/or the SLAT 220 will have multiple, typically four, levels of hierarchical tables. However, for ease of illustration the system 302 illustrates only two levels of hierarchical tables. A hierarchically higher level table 340 can comprise multiple table entries, such as the exemplary table entries 341, 342, 343 and 344. For example, the hierarchically higher level table 340 can be 4 KB in size, and can comprise 512 discrete table entries, which can each be eight bytes in size. Each table entry can comprise a pointer, or other like identifier, of a hierarchically lower level table, such as one of the exemplary hierarchically lower level tables 350 and 360. Thus, for example, the exemplary table entry 341 can comprise an identification of the exemplary hierarchically lower-level table 350, as illustrated by the arrow 371. If the hierarchically higher level table 340 was 4 KB in size, and each table entry was eight bytes in size, at least some of those eight bytes of data can be a pointer or other like identifier of the hierarchically lower level table 350. The exemplary table entry 342 can, in a similar manner, comprise an identification of the hierarchically lower level table 360, as illustrated by the arrow 372. Each of the remaining discrete table entries of the exemplary hierarchically higher level table 340 can, similarly, identify unique hierarchically lower-level tables. Thus, in the example where the hierarchically higher level table 340 was 4 KB in size, and comprised 512 table entries, each of eight bytes in size, such a hierarchically higher level table 340 can comprise 512 identifications of 512 unique hierarchical lower-level tables, such as the exemplary hierarchically lower-level tables 350 and 360.

Each of the hierarchically lower-level tables can, in an analogous manner, comprise individual table entries. For example, the exemplary hierarchically lower-level table 350 can comprise the exemplary table entries 251, 352, 353 and 354. Similarly, the exemplary hierarchically lower-level table 360 can comprise table entries 361, 362, 363 and 364. As one example, each of the hierarchically lower-level tables can be an equivalent size and structure to the hierarchically higher level table 340. Thus, the exemplary hierarchically lower-level table 350 can be 4 KB in size, and can comprise 512 table entries, such as the exemplary table entries 351, 352, 353 and 354, which can each be eight bytes in size. In the example illustrated by the system 302, the cable entries of the hierarchically lower-level tables, such as, for example, the exemplary table entries 351, 352, 353 and 354 of the exemplary hierarchically lower-level table 350 can each identify a contiguous range of memory addresses. For example, the exemplary table entry 351 can identify the range of memory addresses 371, as illustrated by the arrow 391. The range of memory addresses 371 can comprise a "page" of memory and can be the smallest individually manageable quantity of memory. Thus, actions such a moving information stored in volatile memory temporarily to non-volatile storage media, or vice-versa, as part of enabling an amount of virtual memory that is greater than the amount of physical memory installed, can be performed on a page-by-page basis. Additionally, access permissions can be established on a page-by-page basis. For example, because the range of memory 371 is singly identified by the table entry 351, the access permissions can apply to all of the memory addresses within the range of memory 371. Conversely, the access permissions of the memory addresses within the range of memory 371 can be independent of the access permissions established for the range of memory 372, which can be uniquely identified by a different table entry, namely the table entry 352, as illustrated by the arrow 392.

The quantity of memory in a single memory page, such as the range of memory 371, can be dependent on various factors, including processor design and other hardware factors, as well as communicational connections and the like. In one example, a page of memory, such as that represented by the range of memory 371, can be 4 KB in size.

Upon receiving a request to access memory locations identified by one or more memory addresses, a table entry in a hierarchically higher level table can be identified that corresponds to a range of memory addresses that includes the memory addresses that are to be accessed. For example, if the memory addresses to be accessed included the memory represented by the memory 371, the table entry 341 can be identified in the hierarchically higher level table 340. Identification of the table entry 341 can, in turn, resulted in the identification of the hierarchically lower-level table 350. Within the hierarchically lower level table 350 the memory addresses to be accessed can be determined to be part of the memory that is identified by the table entry 351. Information within the table entry 351 can then identify the memory 371 sought to be accessed.

Each such traversal of a hierarchically lower level of the page table can increase the delay between receiving a request to access memory and returning access to that memory. According to one aspect, a table entry of a hierarchically higher level table, such as, for example, the exemplary table entry 341 of the hierarchically higher level table 340, can identify not a hierarchically lower level table, such as the exemplary hierarchically lower-level table 350, but rather a page of memory that can correspond to the entire range of memory that would have been identified by the table entries in a hierarchically lower-level table. Thus, for example, if each page of memory 371, 372 and 373 identified by the individual table entries 351, 352 and 353 of the hierarchically lower-level table 350 was 4 KB in size, then a range of memory of 2 MB in size can be identified by the combined quantity of all of the individual table entries of hierarchically lower-level table 350, since the exemplary hierarchically lower-level table 350 can comprise 512 table entries, each identifying a range of memory 4 KB in size. In such an example, if all 2 MB of memory were treated as a single 2 MB memory page, such a single, large memory page could be identified directly by the exemplary table entry 341 of the hierarchically higher-level table 340. In such an instance, because the exemplary table entry 341 would directly identify a single 2 MB memory page, such as the exemplary 2 MB memory page 370, and would not identify a hierarchically lower level table, there would be no need to reference any hierarchically lower-level table. For example, if a page table or SLAT comprised four hierarchical levels, utilizing a large memory page, such as the exemplary large memory page 370, would enable one of those hierarchical levels of tables to be skipped, and not referenced, thereby providing memory address translation between virtual and physical memory by referencing only three hierarchical levels of tables, instead of four, providing memory access more efficiently, namely 25% more efficiently. Because a page is the smallest amount of individually manageable memory, if a 2 MB sized memory page is used, then memory access permissions, for example, can be the same for all 2 MB of memory in such a large memory page.

As a further example, if there was a hierarchically arranged table that was hierarchically above the exemplary table 340, and each entry in the exemplary table 340, such as the entries 341, 342, 343 and 344 could address a 2 MB memory page, such as the exemplary 2 MB memory page 370, then the 512 individuals such table entries could, when aggregated together, address 1 GB of memory. If a single 1 GB page of memory was used, both the reference to the table 340, and a subsequent reference to a hierarchically lower level table, such as the exemplary table 350, could both be avoided. Returning to the example where a page table or SLAT comprises four hierarchical levels, utilizing such a huge memory page would enable two of those hierarchical levels of tables to be skipped, and not referenced, thereby providing memory address translation between virtual and physical memory by referencing only to hierarchical levels of tables, instead of four, providing memory access in approximately half the time. Again, because a page is the smallest amount of individually manageable memory, if a 1 GB sized memory page is used, then memory access permissions, for example, can be the same for all 1 GB of memory in such a huge memory page.

The term "large memory page", as utilized herein, means a contiguous range of memory that is sized such that it encompasses all of the ranges of memory that would have been identified by a single table at the hierarchically lowest level and can be uniquely and directly identified by a single table entry of a table at one hierarchical level above the hierarchically lowest level table. In the example provided above, a "large memory page", as that term is utilized herein, would be a memory page of 2 MB in size. However, as indicated, the term "large memory page" does not refer to a specific size, but rather the quantity of memory in a "large memory page" is dependent on the hierarchical design of the page table itself and the quantity of memory referenced by each table entry at the hierarchically lowest level of the page table.

In a similar manner, the term "huge memory page", as utilized herein, means a contiguous range of memory that is sized such that it encompasses all of the ranges of memory that would have been identified by a single table at a hierarchically second-lowest level and can be uniquely and directly identified by a single table entry of a table at one hierarchical level above the hierarchically second-lowest level table. In the example provided above, a "huge memory page", as that term is utilized herein, would be a memory page of 1 GB in size. Again, as indicated, the term "huge memory page" does not refer to a specific size, but rather the quantity of memory in a "huge memory page" is dependent on the hierarchical design of the page table itself and the quantity of memory referenced by each table entry at the hierarchically lowest level of the page table.

The descriptions below will focus on the memory address translation performed by reference to the SLAT 220, namely the memory address translation from the virtualized physical memory 320 to the actual physical memory 330. However, the descriptions below are analogously applicable to the memory address translation performed by reference to the page table 270, namely the memory address translation from the virtualized virtual memory 310 to the virtualized physical memory 320.

Turning back to FIG. 2, to provide additional security, the operating system 240 can verify code and/or data that is loaded into memory and can then seek to protect the memory into which such code and/or data was loaded from subsequent modification. In some operating systems, this additional security is provided by a separate set of computer-executable instructions, such as the exemplary secure kernel 252 shown in FIG. 2. However, while the descriptions below will reference the secure kernel 252, the described mechanisms are agnostic as to the source of the instructions to protect memory that cause the hypervisor 210 to modify the SLAT 220 in the manner described. Returning to the example shown in FIG. 2, the memory manager 261 can load a device driver into memory, such as at the request of the kernel 251 as part of a boot process of the operating system 240. Upon loading the driver into memory, the memory manager 261 can provide, to the secure kernel 252 an identification of the driver as loaded in memory, such as by providing, to the secure kernel 252, a starting memory address at which the driver was loaded into memory by the memory manager 261. The secure kernel 252 can verify the contents of the driver as loaded in memory prior to allowing the driver to execute, thereby preventing malicious code from executing. In other words, if the driver had been modified to include malicious, or improper, code, the verification performed for the secure kernel 252 could detect such a modification and, in response, prevent the driver from executing. For example, the secure kernel 252 could hash the driver's code, as loaded into memory by the memory manager 261, and compare the resulting hash to a previously obtained hash of a known good version of the driver's code. If the two hashes match, the secure kernel 252 can determine that the driver, as loaded into memory by the memory manager 261, has not been modified and does not contain any malicious code. The secure kernel 252 can then "bless" the driver, such as by allowing the driver to execute.

To protect code or data that has been loaded into memory, and has been verified by the secure kernel 252, from being subsequently modified, the memory locations at which such code or data has been loaded can have their access permissions changed. Typically, code or data in memory is allowed to be read, known as having "read" permissions, is allowed to be written over, known as having "write" permissions, and, in the case of code, is allowed to be executed from memory, known as having "execute" permissions. The permissions for certain memory addresses can be changed so as to have a different set of permissions. For example, code that was loaded into memory that is to be protected, such as code that was verified by the secure kernel 252, can be protected by setting the permissions of the memory into which such code was loaded to include only "read" and "execute" permissions, but not "write" permissions, thereby preventing modification of the code subsequent to its loading into memory, while still allowing the codes to be read and executed from memory. As another example, data that was loaded into memory that is to be protected, such as data that was verified by the secure kernel 252, can be protected by setting the permissions of the memory into which such data was loaded to include only "read" permissions, thereby preventing modification of the data, since "write" permissions were not enabled, and also preventing execution of any malicious code that may have been inserted into the data, since "execute" permissions were not enabled. As yet another example, code or data can be further protected by allowing no access permissions at all, neither "read" permissions, "write" permissions, nor "execute" permissions.

According to one aspect, such permissions can be set as part of the information contained in the tables of the page table 270. For example, the kernel 251, the secure kernel 252, other components of the operating system 240, or one or more of the applications 281 can 282 can instruct the memory manager 261 to change the access permissions of one or more ranges of memory from the default "read", "write" and "execute" permissions, one of the more limited sets of permissions indicated above, such as only "read" and "execute" permissions, only "read" permissions, or even no access permissions. Attempts to access those ranges of memory through the memory manager 261 in a manner that is not permitted by, or is otherwise inconsistent with, the permissions established for those ranges of memory, will be prevented by the memory manager 261.

However, mechanisms exist for accessing memory that bypass the memory manager 261, and the virtual memory system established by the memory manager 261 in conjunction with the page table 270. For example, a Direct Memory Access (DMA) request can identify one or more specific physical memory addresses and can attempt to read from, right to, or execute from those specified physical memory addresses. Such a DMA request may bypass, or otherwise not be subject to, the access permissions established by the memory manager 261. Consequently, the protections afforded by such access permissions could be bypassed, and malicious code and/or data could be inserted into memory, executed therefrom, or otherwise negatively impact the operation of the computing device and the processes executing thereon.

From within the context of the virtual machine 230, however, DMA requests would target virtualized physical memory, such as the exemplary virtualized physical memory 320 identified in FIG. 3. Such virtualized physical memory 320 would still need to be translated to actual physical memory 330 by reference to the SLAT 220. Consequently, the SLAT 220 can include access permissions that can be enforced across the entire virtual machine process 230, thereby preventing malicious access that could avoid similar access permissions enforced by the memory manager 261 via the page table 270. Such protections are one advantage to utilizing the hypervisor 210 to support a virtual machine 230 and executing processes within the context of the virtual machine 230. Accordingly, to protect code and/or data that has been loaded into memory by the memory manager 261 and verified by the secure kernel 252, the secure kernel 252 can communicate with the hypervisor 210 to set access permissions that can be enforced by the hypervisor 210, with reference to the SLAT 220.

Figure 4:
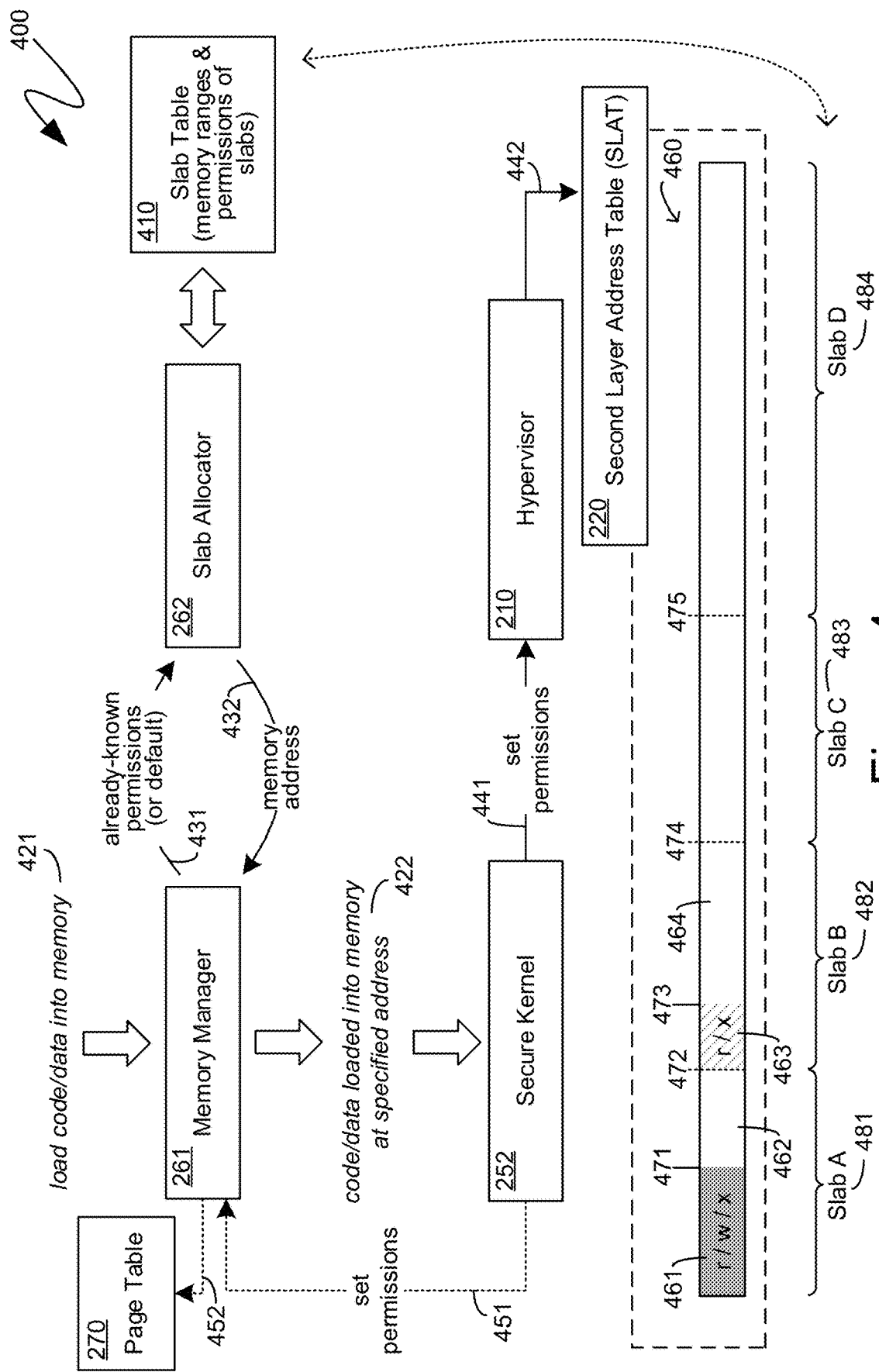
FIG. 4 is a block diagram of an exemplary memory allocation and utilization to achieve efficiencies in memory access from processes executing within the context of a virtual machine.

Turning to FIG. 4, the system 400 shown therein illustrates an exemplary activity of a slab allocator, such as the exemplary slab allocator 262 that was originally shown in FIG. 2, in order to facilitate the avoidance of referencing at least one hierarchical level of tables when performing a lookup in the SLAT 220. More specifically, as demonstrated above in reference to FIG. 3, memory access requests directed to one or more addresses of the virtualized virtual memory 310 can require reference to multiple hierarchical levels of tables in the page table 270 to identify one or more addresses of virtualized physical memory 320, and can then further require reference to multiple hierarchical levels of tables in the SLAT 220 to identify one or more addresses of actual physical memory 330, corresponding to the one or more addresses a virtualized physical memory 320, and thereby enable the memory access. As further demonstrated above, again in reference to FIG. 3, if large pages, or huge pages, of memory are utilized, as those terms have been explicitly defined herein, reference to at least one hierarchical level of tables in, for example, the SLAT 220 can be avoided, thereby increasing the speed of the memory access.

The utilization of a large page of memory, for example, entails the setting of access permissions for the large page of memory, with such access permissions applying to all of the memory locations encompassed by the large page of memory. In other words, the memory encompassed by a large page of memory is treated as a single, indivisible quantity insofar is the establishment of access permissions.

To utilize large pages of memory, or huge pages of memory, a slab allocator, such as the exemplary slab allocator 262, can establish "slabs" of memory that correspond to large pages or huge pages of memory, as those terms have been explicitly defined herein. More specifically, a slab allocator, such as the exemplary slab allocator 262, can establish ranges of memory, in the form of beginning and ending memory addresses, and corresponding memory access permissions, that have a same quantity of memory within the range as the quantity of memory that would be a large page or huge page, again, as those terms have been explicitly defined herein. The term "slab" is utilized to distinguish the designations and groupings performed by a slab allocator, such as the exemplary slab allocator 262, from the paging of memory, including the paging of memory into large pages and/or huge pages, performed by the memory manager 261 with reference to the page table 270, and the hypervisor 210, with reference to the SLAT 220.

In the exemplary system 400 shown in FIG. 4, the slab allocator 262 is illustrated as a separate component and is further illustrated as being communicationally coupled with a slab table 410. The descriptions below, however, are equally applicable to a slab allocator that is implemented as part of the memory manager 261 and/or the hypervisor 210. Similarly, the descriptions below are equally applicable to data maintained internally, and do not require a separately accessible slab table, such as the exemplary slab table 410.

As illustrated by the exemplary system 400, a memory manager, such as the exemplary memory manager 261 can load code and/or data into memory, as illustrated by the action 421. As part of such a loading 421 into memory, the memory manager 261 can select one or more memory addresses into which to load such code and/or data. According to one aspect, the selection of such one or more memory addresses can be informed by a slab allocator, such as the exemplary slab allocator 262. More specifically, the memory manager 261 can obtain, can be programmed to have, or can otherwise be provided access to, metadata that can indicate what sort of memory access permissions will be assigned to the memory addresses into which the code and/or data is loaded by the action 421. The memory manager 261 can utilize this information, as illustrated by the communication 431, to determine from the slab allocator 262, such as is illustrated by the communication 432, into which memory addresses to load the code and/or data. For example, the utilization of what is perceived, by the memory manager 261, executing within a virtual computing environment, to be physical memory, or, as defined herein, virtualized physical memory, can be represented by the range of virtualized physical memory 460. The SLAT 220 can then comprise hierarchical levels of tables that can correlate this virtualized physical memory to actual physical memory, thereby enabling memory access to proceed.

In the example illustrated by the system 400, an initial range of memory 461 can have already been utilized and code and/or data can have already been loaded into the initial range of memory 461, such as by the memory manager 261. For purposes of illustration, the code and/or data loaded into the initial range of memory 461 need not be protected and the memory access permissions can be default memory access permissions, which can typically be the availability of "read" functionality, "write" functionality and "execute" functionality. Absent the mechanisms described herein, the loading of subsequent code and/or data into memory, as illustrated by the action 421, can result in the memory manager 261 loading such subsequent code and/or data into memory starting at the next available memory location, which can be the memory location 471 graphically represented in FIG. 4. If the code and/or data loaded into memory by the action 421 is code and/or data that is to be protected, the memory access permissions assigned to one or more memory addresses commencing with the memory address 471 can be changed from the read, write and execute permissions set for the block of memory 461 and could be, instead, for example, only "read" and "execute" permissions. As detailed above, if the range of memory 461 is smaller than a large page of memory, a large page of memory will not be able to be utilized since the memory access permissions will differ across the large page. For example, if a large page of memory would encompass all of the ranges of memory up until the memory address 472, then the memory range 461, having the read, write and execute permissions, would have different memory access permissions than the subsequent memory range, starting with the memory address 471, which, in the present hypothetical example, would have only read and execute permissions. The ability to set such permissions differently would require the use of a smaller page size than a large page, thereby requiring that traversal of the hierarchical levels of tables of the SLAT 220 not skip any of those hierarchical levels and, instead, consider the tables at each one of the hierarchical levels.

According to one aspect, a slab allocator, such as the exemplary slab allocator 262 can allocate a slab, such as the exemplary slab 481. The exemplary slab 481 can be aligned to memory addresses such that the range of memory addresses on either side of the exemplary slab 481 are not smaller than a large page as that term has been explicitly defined herein. Thus, for example, the exemplary slab 481 can commence at the beginning of the range of virtualized physical memory 460 and can end at a memory address 472 such that the range of memory addresses responding to the slab 481 can be a large page or a huge page. The exemplary slab 481 can further be associated with, such as within the exemplary slab table 410, the memory access permissions of code and/or data that is either already loaded into memory encompassed by the slab 481, or which is expected to be loaded into the memory encompassed by the slab 481.

A subsequent slab, such as the exemplary slab 482, can also be allocated by the slab allocator 262. As with the exemplary slab 481, the exemplary slab 482 can be aligned to memory addresses such that the range of memory addresses on either side of the exemplary slab 482 are not smaller than the large page. Thus, for example, the exemplary slab 482 can be associated with a range of memory that can start at the memory address 472 at which the prior slab, namely the exemplary slab 481, ended, thereby not leaving a smaller than large page quantity of memory between the exemplary slab 481 and the exemplary slab 482. Additionally, the exemplary slab 482 can, such as by the exemplary slab allocator 262, the associated with memory access permissions of code and/or data that is either already loaded into memory encompassed by the slab 482, or which is expected to be loaded into the memory encompassed by the slab 482. As before, such an association can be enumerated within a slab table, such as the exemplary slab table 410. In the example illustrated by the system 400 shown in FIG. 4, the exemplary slab 482 can be associated with only read and execute permissions.

Consequently, according to one aspect, when determining into which one or more memory locations the code and/or data is to be loaded by the action 421, the memory manager 261 can, for example, identify such code and/or data as being protected such that when such code and/or data is loaded into memory, the range of memory into which it is loaded will be protected with only read and execute permissions. With such information, such as can be provided by the communication 431, the slab allocator 462 can identify the memory address 472 via the communication 432. The memory manager 261 can then load the code and/or data into the memory address, as illustrated by the action 422, and can provide the memory address, or range of memory addresses, to the secure kernel 252. As detailed above, the secure kernel 252 can bless the code and/or data and can instruct the hypervisor 210 to establish memory access permissions that can protect such code and/or data, as illustrated by the communication 441. In response, the hypervisor 210 can set the memory access permissions for the relevant memory addresses to only read and execute permissions in one or more of the hierarchical levels of tables of the SLAT 220, as illustrated by the action 442. Additionally, the secure kernel can also instruct, as illustrated by the communication 451, the memory manager 261 to set corresponding permissions, as illustrated by the communication 452, in the page table 270.

In such a manner, even though free space 462 remains, the code and/or data loaded into memory by the memory manager 261 can be loaded, not at the memory address 471, but rather commencing with the memory address 472. Consequently, the range of memory from the beginning of the virtualized physical memory 460 until the address 472 can have a same set of access permissions and can be treated as a single memory page, namely a large page. Analogously, the range of memory from the memory address 472 until the memory address 474 can also have a same set of access permissions, mainly only read and execute permissions in the illustrated example, and, consequently, can also be treated as a single memory page, namely a large page as well. By establishing such memory pages as large pages, at least one hierarchical level of tables in the SLAT 220 can be skipped when such memory locations are accessed, increasing the speed and efficiency of memory access as detailed above.

Subsequent code and/or data can be loaded into memory in a similar manner. For example, additional code and/or data that is to be loaded into memory and for which the memory manager 261 knows, or can otherwise determine, that the memory access permissions that will be set on the memory into which such code and/or data is loaded will be only read and execute memory permissions, then such additional code and/or data can be loaded into the free space 464, such as starting at the memory address 473. In such a way, the memory access permissions for the single page of memory spanning between memory addresses 472 and 474 can be the same and that single page of memory can be a large page as that term has been explicitly defined herein. Similarly, if the subsequent code and/or data that is to be loaded into memory will have default access permissions, such as, for example, read, write and execute permissions, then such subsequent code and/or data can be loaded into the free space 462, which can start at the memory address 471. In such a way, memory access permissions can remain consistent from the start of the virtualized physical memory 460 until the memory address 472, enabling such a range of memory to be treated as a single large page.

According to one aspect, slabs corresponding to known permutations of memory access permissions can be delineated in advance, such as by a slab allocator 262. Thus, for example, an initial or beginning range of memory can be associated with a first slab, such as the exemplary slab 481, and can be associated with default memory access permissions, since the code and/or data that is initially loaded into memory can include code and/or data that does not need to be protected. Thus, for example, the exemplary slab 481 can be associated with default memory access permissions, such as, for example, read, write and execute permissions. A subsequent memory slab, such as the exemplary memory slab 482, can be associated with one permutation of non-default memory access permissions. For example, as illustrated in the exemplary system 400 shown in FIG. 4, the exemplary slab 482 can be associated with only read and execute memory permissions. Still other slabs can be associated with other non-default memory access permissions. For example, the exemplary slab 483 can be associated with only read permissions, and no write or execute permissions. A still further slab can be associated with no access permissions. Depending on a quantity of memory remaining, one or more slabs corresponding to memory ranges that would be encompassed by a huge page, as that term has been explicitly defined herein, can be delineated, thereby further increasing the memory access efficiencies gained, as detailed above.

According to an alternative aspect, slabs can be delineated once the first code and/or data, which is to be loaded into memory having a specific set of memory access permissions, is about to be loaded into memory. Thus, for example, within the exemplary system 400 shown in FIG. 4, the slab 482 can have been allocated by the slab allocator 262 once the code and/or data was about to be loaded into memory. More specifically, the slab allocator 262 can allocate the slab 482 in response to the communication 431 from the memory manager 261 identifying a known set of permissions for the code and/or data that was to be loaded into memory as part of the action 421. In response to the communication 431, the slab allocator 462 can determine whether an existing, already allocated slab has corresponding memory access permissions that are the same as the memory access permissions for the code and/or data that is to be loaded into memory by the memory manager 261. If such a slab already exists, the slab allocator 262 can further determine whether sufficient space remains within the slab to accommodate the code and/or data that is to be loaded into memory. If either a slab corresponding to memory access permissions that are the same as the memory access permissions for the code and/or data does not already exist, or if such a slab does exist but an insufficient quantity of available memory remains available within the slab, the slab allocator 262 can allocate a new slab.

As indicated previously, the allocation of a slab, such as by the slab allocator 262, can be independent of any actual memory access functions, and can be performed without immediately impacting the page table 270 and/or the SLAT 220. According to one aspect, however, in some instances known safe patterns of data can be written to memory in order to preserve the slat allocations that enable the utilization of large pages and/or huge pages. For example, when the secure kernel 252 sets the read and execute only memory access permissions, such as via the communication 441, for the code and/or data that was loaded into memory as part of the actions 421 and 422, the memory range 463, into which such code and or data was loaded, can have such read and execute only memory access permissions associated with it. The remaining memory range 464 of the slab 482 can have no code and/or data having been written to it as of yet. In such an instance, because the used portion of memory 463 is smaller than a large page, the hierarchical levels of tables of the SLAT 220 may identify the range of memory 463 using one or more regularly-sized memory pages, thereby requiring each hierarchical level of tables to be traversed as part of a memory access, and, thereby, not affording the above-described efficiencies. Stated differently, in the present example, to establish the range of memory addresses from the memory address 472 to the memory address 474 as a single large page, data and/or code may need to be written to all of the memory corresponding to the memory addresses between memory address 472 and memory address 474. In such an example, to enable the range of memory from the memory address 472 to the memory address 474 to be treated as a single large page even when a portion 464 remains unused, the unused portion 464 can be filled with a known safe pattern of data, such as known "no-op" instructions or the like.

Analogously, if slabs, such as the exemplary slab 483 are allocated by the slab allocator 462 in advance, and before any code and/or data are written to memory encompassed by the exemplary slab 483, then the entirety of the memory range encompassed by the exemplary slab 483, such as the memory range from memory address 474 to memory address 475, can be filled with a known safe pattern of data, such as known "no-op" instructions or the like.

According to one aspect, to prevent subsequent fragmentation, the hypervisor 210 can prevent demand-paging for portions of slabs. More specifically, if new code and/or data needs to be stored in actual physical memory, and there is an insufficient amount of available actual physical memory, code and/or data already stored in actual physical memory can be "paged out" by the hypervisor 210 and written to non-volatile storage, with the actual physical memory where such code and/or data was previously stored now being available for the new code and/or data. Such demand-paging can result in fragmentation. For example, if a portion of the code and/or data stored in the range of memory 463 was paged out and the new code and/or data written in its place did not require "read" and "execute" permissions only, then the exemplary slab 482 would no longer be able to be represented by a single large page. Thus, according to one aspect, to prevent such fragmentation, demand-paging for memory that is part of a slab can be prevented.

In some instances, the memory access permissions that can be established for a set of code and/or data loaded into memory, such as memory access permissions that can be established by the secure kernel 252, in communication with the hypervisor 210, and with reference to the SLAT 220, may not be known or determinable in advance by the memory manager 261 and/or the slab allocator 262. In such an instance, the code and/or data can be loaded into memory as if it will be assigned default permissions, and can subsequently be moved to facilitate utilization of large pages and/or huge pages if the memory access permissions subsequently assigned to the code and/or data result in contiguous memory segments of smaller then a large page and/or huge page having different memory access permissions, thereby thwarting the ability to utilize a large page and/or a huge page and achieve the memory access deficiencies described herein.

Figure 5:
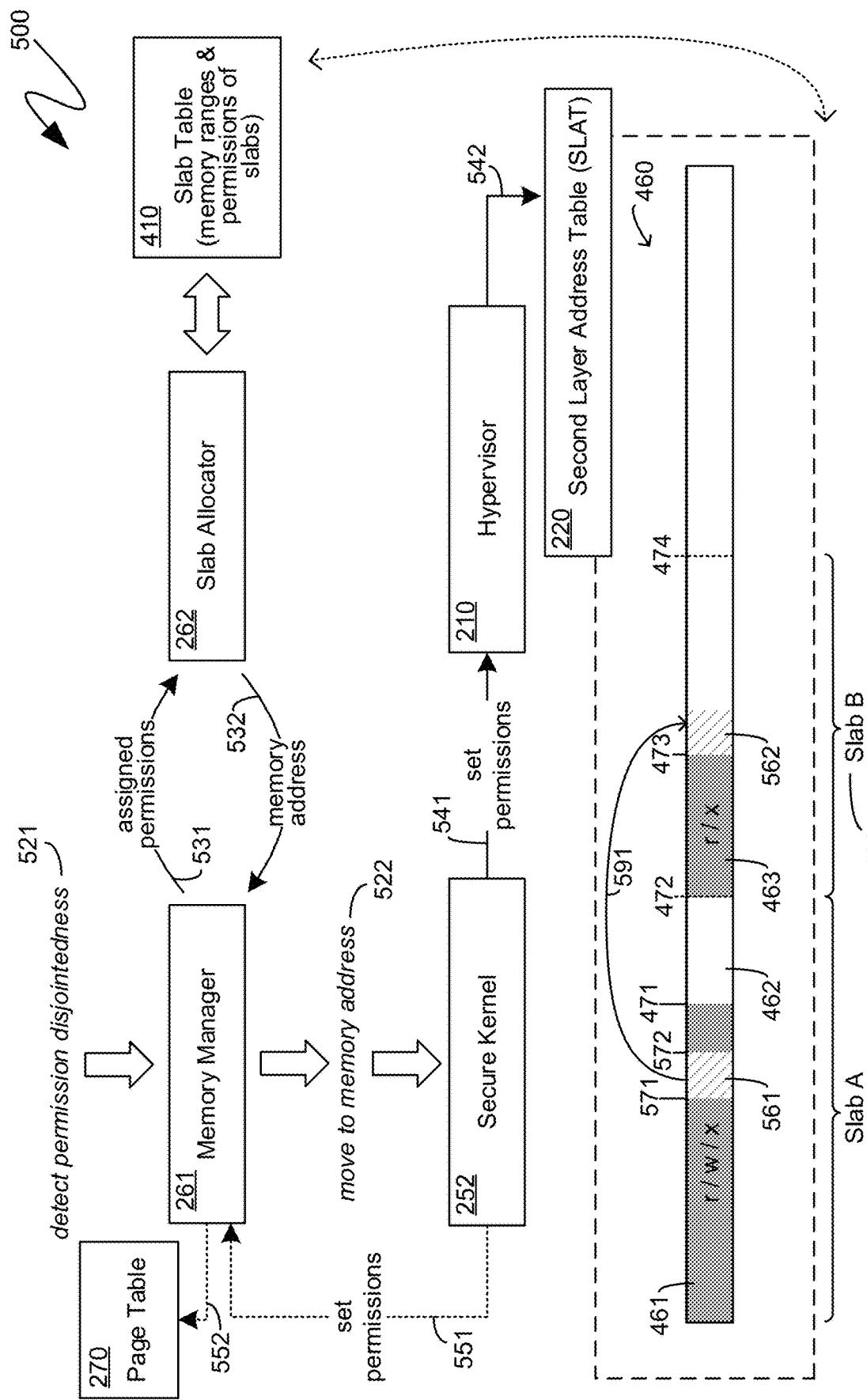
FIG. 5 is a block diagram of an exemplary memory allocation modification to achieve efficiencies in memory access from processes executing within the context of a virtual machine.

Turning to FIG. 5, the system 500 shown therein illustrates an the exemplary move of code and/or data that was previously loaded into memory but whose established permissions for the ability to utilize a large page and/or huge page as those terms have been explicitly defined herein. More specifically, a set of code and/or data can have been loaded into the memory range 561 that is part of the slab 481. A single large page can encompass all of the memory addresses from the beginning of the virtualized physical memory 460 until the memory address 471. However, when the range of memory 561 has its memory access permissions changed, such as from the default read, write and execute permissions to, for example, only read and execute permissions, such as can be done by the secure kernel 252, then such a single large page can no longer be utilized, and memory access directed to any of the memory from the beginning of the virtualized physical memory 460 until the memory address 471 can require reference to each of the hierarchical layers of tables of the SLAT 220.

According to one aspect, therefore, such a disjointedness in the permissions can be detected, as illustrated by the action 521. Such a detection can be performed by the memory manager 261, the slab allocator 262, or other component or other like set of computer executable instructions. Subsequently, the code and/or data that was previously loaded into the memory range 561 can be moved. For example, the memory manager 261 can now know the memory access permissions applicable to such code and/or data. Consequently, the memory manager 261 can attempt to load the code and/or data again into memory, and, as detailed above, can communicate the known memory access permissions to the slab allocator 262, as illustrated by the communication 531. In response, and is also detailed above, the slab allocator 262 can return, such as via the communication 532, one or more memory addresses at which the memory manager 261 can load such code and/or data, with such memory addresses, provided by the communication 532, being part of a slab, such as the exemplary slab 482, that can already be associated with the relevant memory access permissions.

For example, within the exemplary system 500 shown in FIG. 5, such a subsequent loading into memory of the code and/or data that was originally loaded into the memory range 561, can result in the slab allocator 262 identifying memory address 473 as the next available memory address within the slab 482, which is associated with the read and execute only memory access permissions that the code and/or data that was originally loaded into the memory range 561 will be assigned, such as by the secure kernel 252. The memory manager 261 can then reload the code and/or into memory starting at memory address 473, as indicated by the memory range 562. Once such code and/or data has been loaded again into memory, now at the memory range 562, the new memory range 562 can be provided to the secure kernel 252. The secure kernel 252 can set permissions to read and execute only, as illustrated by the communication 541, and the hypervisor 210, upon receiving such an instruction from the secure kernel 252, can update the SLAT, as indicated by the communication 542. As a result, the range of memory 463 and the contiguous range of memory 562 can both have the same memory access permissions. More specifically a single large page can be utilized to reference all of the memory between memory location 472 and 474, and the memory access permissions of such memory can be uniform, thereby enabling the utilization of a single large page in such a manner.

To enable the utilization of a single large page to reference all of the memory from the start of the virtualized physical memory 460 until memory address 471, the code and or data loaded into the memory range 561, whose memory access permissions differ from those set forth contiguous memory ranges, such as the exemplary memory range 461, can be deleted or otherwise removed. The net result can be a move 591 of the code and/or data from the memory range 561 to the memory range 562.

Should additional code and data need to be loaded into memory, where such code and/or data will have read, write and execute permissions, the loading of such code and/or data can commence with address 571 and continue until address 572 so as to use up the "hole" of unused memory, left unused by the removal of the prior code and/or data that was stored to there. The loading of code and/or data into memory can then skip ahead and recommence with memory address 471.

The moving of code and/or data to eliminate fragmentation and enable the utilization of a large page, or huge page, can also be utilized should demand-paging not be prevented. More specifically, as indicated previously, to prevent fragmentation, demand-paging can be prevented for a range of memory encompassed by a slab. According to another aspect, however, demand-paging can be allowed and, should such demand-paging result in fragmentation, then the above-described move mechanisms can be utilized to defragment and restore the ability to utilize large and/or huge pages.

Figure 6:
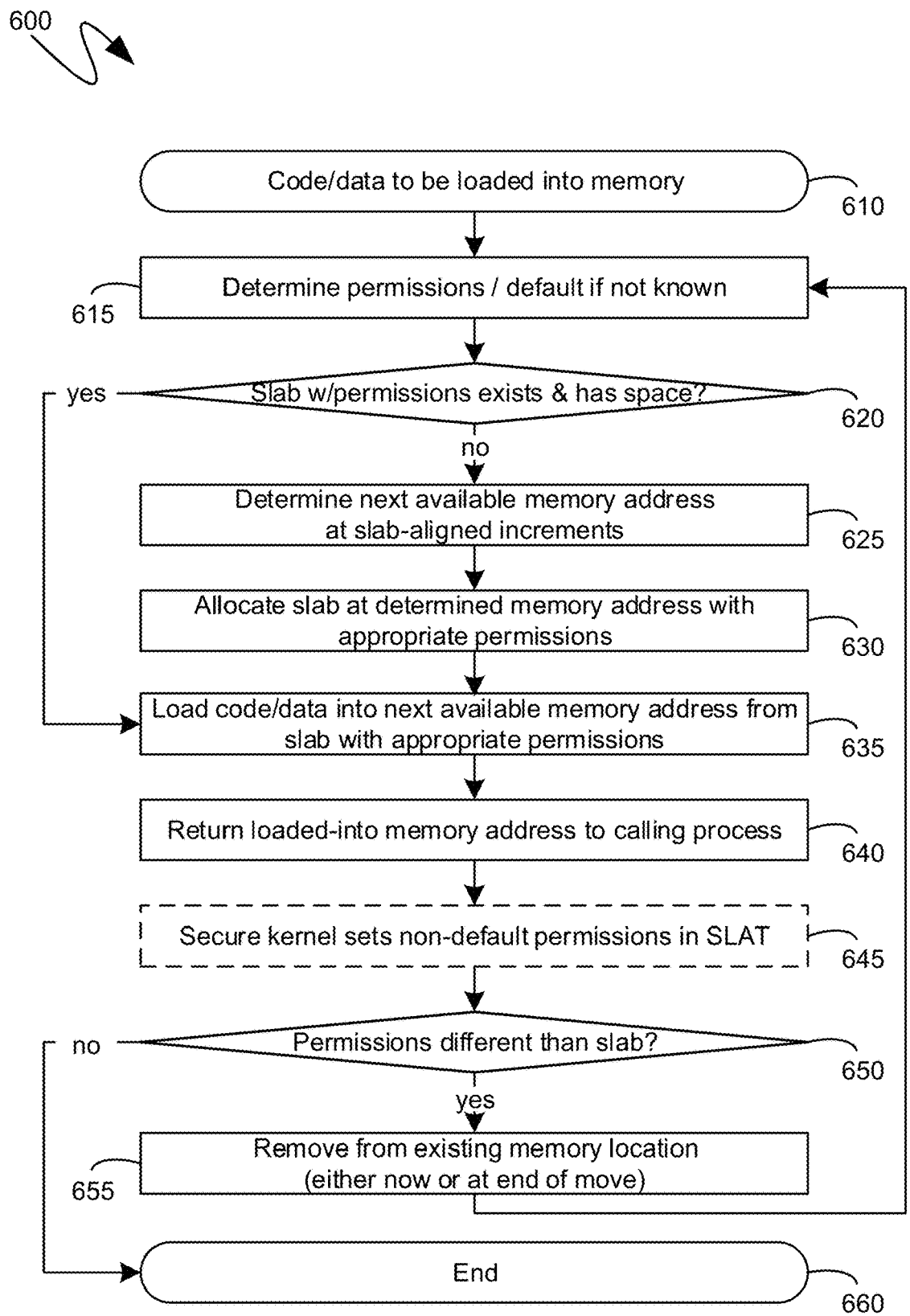
FIG. 6 is a flow diagram of an exemplary memory allocation and utilization to achieve efficiencies in memory access from processes executing within the context of a virtual machine.

Turning to FIG. 6, the exemplary flow diagram 600 shown therein illustrates an the exemplary series of steps by which code and/or data loaded into memory can be loaded, or subsequently moved, so as to facilitate the utilization of large pages, and/or huge pages and achieve the memory access efficiencies attendant therein. More specifically, and as illustrated in FIG. 6, initially, at step 610, an appropriate command can be issued to load an identified set of code and/or data into memory. Step 610 can entail the invocation of one or more of the operating system's functionality that enables code and/or data to be loaded into memory, the loading into memory of code and/or data by BIOS or other like hardware-encoded computer-executable instructions, the loading into memory of code and/or data by an application program that will utilize such code and/or data and other like mechanisms.

At step 615, a determination can be made whether the memory access permissions, that will be assigned to the memory into which the code and/or data of step 610 is loaded, are known in advance. For example, a memory manager can be programmed such that, when it commences loading of specific drivers, it is aware that the memory into which of those drivers are loaded will be assigned non-default memory access permissions. As another example, a table, or other like data structure, can be maintained that can, such as via name, hash value, system-assigned identifier, or other unique identifier, identify the memory access permissions of the memory into which a set of code and/or data will be loaded. If, at step 615, a specific set of memory access permissions is not known or determinable in advance, a default set of permissions can be assumed. As one example, a default set of permissions can include read, write and execute permissions.

At step 620, a determination can be made whether an existing slab, as that term has been defined and utilized herein, both has available memory into which the code and/or data of step 610 can be loaded and further is correlated to the same memory access permissions as were determined at step 615. If, at step 620, it is determined that such an existing slab does not exist, processing can proceed with step 625, at which point a determination can be made as to the next available memory address at slab-aligned increments. As indicated previously, slabs of memory can be allocated such that the memory ranges between such slabs are not memory ranges that are too small to support a large page and/or a huge page. For example, slabs of memory can be continuously allocated such that there is no range of one or more memory addresses and/or locations between the end of a range of memory encompassed by a previously established slab and the beginning of a range of memory encompassed by a newly allocated slab. Furthermore, to avoid ranges of one or more memory addresses that are too small to support large pages and/or huge pages at the beginning of available memory, slabs can be allocated along large-page-sized or huge-page-size increments. For example, if a large page encompasses 2 MB of memory, then slabs can be aligned at 2 MB increments starting from the beginning of, for example, the virtualized physical memory.

At step 630, a new slab can be allocated commencing with the memory address determined at step 625. The new slab, allocated at step 630, can be associated with the memory permissions determined at step 615. Subsequently, at step 635, the code and/or data of step 610 can be loaded into the next available memory address from a slab that is associated with the memory access permissions that were determined at step 615. If step 635 is performed after step 630, then at least a portion of the code and/or data of step 610 can be loaded into memory addresses that are part of the slab that was allocated at step 630. Conversely, if step 635 is performed immediately subsequent to step 620, then the memory addresses into which the code and/or data of step 610 is loaded can be memory addresses that can be part of a slab that was allocated previously, such as by a prior performance of step 630.

At step 640, a pointer, or other like identifier, of the one or more memory addresses into which the code and/or data of step 610 were loaded, at step 635, can be returned to whatever process invoked, or otherwise requested, such a loading of the code and/or data into memory. In some instances, step 640 can be performed by providing a pointer, or other like identifier, to the kernel, or secure kernel, of an operating system. For example, the loading of the driver can entail the provision of a pointer to the driver, in memory, to the secure kernel so that the secure kernel can verify that the code of the driver that was loaded into memory has not been maliciously, or otherwise improperly, modified. Once the secure kernel has verified the code and/or data loaded into memory, such as by performing a hash of the code and/or data and comparing it to a hash of known good code and/or data, the secure kernel can "bless" the code and/or data. As indicated previously, to protect such code and/or data from being modified, write memory permissions can not be set for the memory into which such code and/or data was loaded. For example, the memory into which such code and/or data was loaded can be protected by allowing only read and execute permissions, only read permissions, or not even allowing access. As indicated previously, such memory access permissions can be set in the SLAT so that they cannot be bypassed by DMA requests, or other like activities from within the virtual computing environment. The setting of such non-default memory access permissions in the SLAT is illustrated at step 645. Because such a step may not be performed for all code and/or data that is loaded into memory, it is illustrated with dashed lines in FIG. 6 to indicate that it is optional.

Subsequently, at step 650, a determination can be made whether the memory access permissions set for the range of memory into which the code and/or data of step 610 were loaded differ from the permissions associated with the slab into which the code and/or data of step 610 were loaded at step 635. If, at step 650, it is determined that there is a difference in memory access permissions, thereby frustrating the ability to skip at least one hierarchical level of tables in the SLAT when performing a memory access, then processing can proceed to move the code and/or data of step 610 to a slab associated with memory access permissions that are the same as those now known to be assigned to the one or more memory addresses into which the code and/or data of step 610 are loaded. For example, such a move can entail performing steps 615 through 645 again, except with a new copy of the code and/or data of step 610 being loaded into memory at a new location within a slab associated with memory access permissions that are the same as those now known to be assigned to the one or more memory addresses into which the code and/or data of step 610 are loaded. As part of such a move, the code and/or data can be removed from the memory addresses into which it was originally loaded, whose memory access permissions were then set differently than the memory access permissions of the surrounding memory addresses, as determined at step 650. Such a removal is illustrated by step 655.

If, at step 650, there is no permission discrepancy detected, then the relevant processing can end at step 660.

The descriptions above include, as a first example a method of increasing a speed of access of computer memory, the method comprising: receiving a request to load a first set of code and/or data into memory; determining a first set of memory access permissions that are expected to be set for a first set of memory into which the first set of code and/or data is stored; allocating a first memory slab, into which to load only code and/or data expected to have the first set of memory access permissions, if either a memory slab associated with the first set of access permissions has not already been created or if all previously created memory slabs associated with the first set of access permissions do not have a quantity of available memory sufficient to accommodate the first set of code and/or data; identifying a first set of available memory in the first memory slab, if the first memory slab has already been created and has the quantity of available memory sufficient to accommodate the first set of code and/or data; and loading the first set of code and/or data into the first set of available memory; wherein, within a page table correlating memory addresses in a first memory addressing scheme to memory addresses in a second, different memory addressing scheme, a first range of memory encompassed by the first slab is identified by reference to a single table entry of a table that is at least one hierarchical level above a hierarchically lowest level of tables in the page table, the first range of memory being identified without reference to any table in the hierarchically lowest level of tables.

A second example is the method of the first example, wherein the page table is a Second Layer Access Table (SLAT) maintained by a hypervisor.

A third example is the method of the second example, further comprising: providing access to the first set of code and/or data as loaded into a first set of memory to an operating system process; wherein the operating system process verifies the code and/or data as loaded into the first set of memory and, if properly verified, instructs the hypervisor to set the first set of memory access permissions for the first set of memory in the SLAT.

A fourth example is the method of the first example, wherein the first set of memory access permissions are non-default memory access permissions that comprise one of: (1) only read and execute permissions, (2) only read permissions or (3) no access permissions.

A fifth example is the method of the first example, wherein the first range of memory is 2 MB.

A sixth example is the method of the first example, wherein the first range of memory encompassed by the first slab is identified by reference to a single table entry of a table that is two hierarchical levels above the hierarchically lowest level of tables in the page table, the first range of memory being identified without reference to any table in the hierarchically lowest level of tables and without reference to any table in a hierarchically second-lowest level of tables that is one hierarchical level above the hierarchically lowest level of table.

A seventh example is the method of the sixth example, wherein the first range of memory is 1 GB.

An eighth example is the method of the first example, wherein the allocating the first memory slab comprises establishing a starting address of the first range of memory to be spaced apart from an ending address of a second range of memory encompassed by a prior slab such that an intermediate range of memory between the ending address of the second range and the starting address of the first range can be identified utilizing either one large memory page or one huge memory page.

A ninth example is the method of the first example, further comprising preventing demand-paging for the first range of memory.

A tenth example is the method of the first example, further comprising: writing a known safe pattern of data to remaining available memory locations in the first memory slab.

An eleventh example is the method of the first example, further comprising: determining that a first set of memory into which the first set of code and/or data was loaded has a second set of memory access permissions that differ from the first set of memory access permissions; allocating a second memory slab, into which to load only code and/or data expected to have the second set of memory access permissions, if either a memory slab associated with the second set of access permissions has not already been created or if all previously created memory slabs associated with the second set of access permissions do not have the quantity of available memory sufficient to accommodate the first set of code and/or data; identifying a second set of available memory locations in the second memory slab, if the second memory slab has already been created and has the quantity of available memory locations sufficient to accommodate the first set of code and/or data; loading the first set of code and/or data into the second set of available memory; and removing the first set of code and/or data from the first set of memory, the first set of memory being part of the first slab.

A twelfth example is the method of the first example, further comprising: pre-allocating at least one slab of memory corresponding to at least some non-default sets of memory access permissions; wherein the non-default sets of memory access permissions comprise: (1) only read and execute permissions, (2) only read permissions and (3) no access permissions.

A thirteenth example is a computing device comprising: one or more central processing units (CPUs); random access memory (RAM); and one or more computer-readable media comprising: a first set of computer-executable instructions, which, when executed by the computing device, cause the computing device to provide a hypervisor performing steps comprising: receiving a first memory access directed to a first set of virtualized physical memory; traversing multiple hierarchical levels of tables of a Second Layer Access Table (SLAT) maintained by the hypervisor to identify a first set of actual physical memory, provided by the RAM, that corresponds to the first set of virtualized physical memory; and enabling the first memory access to the first set of actual physical memory; and a second set of computer-executable instructions, which, when executed by the computing device, cause the computing device to provide a slab allocator performing steps comprising: allocating a first memory slab, into which to load only code and/or data expected to have a first set of memory access permissions, if either a memory slab associated with the first set of access permissions has not already been created or if all previously created memory slabs associated with the first set of access permissions do not have a quantity of available memory sufficient to accommodate a first set of code and/or data that is to be loaded into memory; and identifying a first set of available memory in the first memory slab, if the first memory slab has already been created and has the quantity of available memory sufficient to accommodate the first set of code and/or data; wherein the traversing the multiple hierarchical levels of tables of the SLAT to identify the first set of actual physical memory comprises identifying the first set of actual physical memory without reference to any table in a hierarchically lowest level of tables of the SLAT because the first slab is coextensive with either a large page or a huge page in the SLAT.

A fourteenth example is the computing device of the thirteenth example, wherein the one or more computer-readable media comprise a third set of computer-executable instructions, which, when executed by the computing device, cause the computing device to provide an operating system process performing steps comprising: verifying the first set of code and/or data from a first set of memory locations into which the first set of code and/or data was loaded; and instructing the hypervisor to set, in the SLAT, the first set of access permissions for the first set of memory if the verifying was successful.

A fifteenth example is the computing device of the fourteenth example, wherein the verifying comprises comparing a hash of the first set of code and/or data from the first set of memory to a hash of a known good version of the first set of code and/or data.

A sixteenth example is the computing device of the thirteenth example, wherein the first set of memory access permissions are non-default memory access permissions that comprise one of: (1) only read and execute permissions, (2) only read permissions or (3) no access permissions.

A seventeenth example is the computing device of the thirteenth example, wherein a large page is 2 MB and a huge page is 1 GB.

An eighteenth example is the computing device of the thirteenth example, wherein the one or more computer-readable media comprise a third set of computer-executable instructions, which, when executed by the computing device, cause the computing device to write a known safe pattern of data to remaining available memory in the first memory slab.

A nineteenth example is the computing device of the thirteenth example, wherein the one or more computer-readable media comprise a third set of computer-executable instructions, which, when executed by the computing device, cause the computing device to perform steps comprising: determining that a first set of memory into which the first set of code and/or data was loaded has a second set of memory access permissions that differ from the first set of memory access permissions; allocating a second memory slab, into which to load only code and/or data expected to have the second set of memory access permissions, if either a memory slab associated with the second set of access permissions has not already been created or if all previously created memory slabs associated with the second set of access permissions do not have the quantity of available memory sufficient to accommodate the first set of code and/or data; identifying a second set of available memory in the second memory slab, if the second memory slab has already been created and has the quantity of available memory locations sufficient to accommodate the first set of code and/or data; loading the first set of code and/or data into the second set of available memory; and removing the first set of code and/or data from the first set of memory, the first set of memory being part of the first slab.

One or more computer-readable storage media comprising computer-executable instructions, which when executed, cause a computing device to: receive a request to load a first set of code and/or data into memory; determine a first set of memory access permissions that are expected to be set for a first set of memory into which the first set of code and/or data is stored; allocate a first memory slab, into which to load only code and/or data expected to have the first set of memory access permissions, if either a memory slab associated with the first set of access permissions has not already been created or if all previously created memory slabs associated with the first set of access permissions do not have a quantity of available memory sufficient to accommodate the first set of code and/or data; identify a first set of available memory in the first memory slab, if the first memory slab has already been created and has the quantity of available memory sufficient to accommodate the first set of code and/or data; and load the first set of code and/or data into the first set of available memory; wherein, within a page table correlating memory addresses in a first memory addressing scheme to memory addresses in a second, different memory addressing scheme, a first range of memory encompassed by the first slab is identified by reference to a single table entry of a table that is at least one hierarchical level above a hierarchically lowest level of tables in the page table, the first range of memory being identified without reference to any table in the hierarchically lowest level of tables.

As can be seen from the above descriptions, mechanisms by which memory access through a SLAT can be accelerated. In view of the many possible variations of the subject matter described herein, we claim as our invention all such embodiments as may come within the scope of the following claims and equivalents thereto.

We claim:

1. A computing device comprising:
a processing unit;
random access memory (RAM) coupled to the processing unit;
a hypervisor performing steps comprising:
receiving a first memory access directed to a first set of virtualized physical memory;
identifying a first set of actual physical memory, provided by the RAM, that corresponds to the first set of virtualized physical memory by traversing multiple hierarchical levels of tables of a Second Layer Address Table (SLAT) maintained by the hypervisor; and
enabling the first memory access to the first set of actual physical memory; and
a slab allocator process performing steps comprising:
allocating a first memory slab associated with a first set of memory access permissions, the first memory slab being coextensive with either a first large page in the SLAT or a first huge page in the SLAT, wherein:
the first large page is a first range of memory sized to encompass ranges of memory in a first table at one hierarchical level above a hierarchically lowest level of the multiple hierarchical levels of tables;
the first huge page is a second range of memory sized to encompass ranges of memory in a second table at least two hierarchical levels above the hierarchically lowest level of the multiple hierarchical levels of tables; and
the traversing the multiple hierarchical levels of tables of the SLAT comprises identifying the first set of actual physical memory without reference to any table in the hierarchically lowest level of tables of the SLAT.

2. The computing device of claim 1, further comprising:
an operating system process performing steps comprising:
verifying a first set of code and/or data from a first set of memory into which the first set of code and/or data was loaded, the first set of memory being part of either the first large page or the first huge page; and
instructing the hypervisor to set, in the SLAT, the first set of access permissions for the first set of memory if the verifying was successful.

3. The computing device of claim 2, wherein the verifying comprises comparing a hash of the first set of code and/or data from the first set of memory to a hash of a known good version of the first set of code and/or data.

4. The computing device of claim 2, wherein the operating system process performs further steps comprising:
instructing a memory manager to set, in a page table that is separate from the SLAT, the first set of access permissions for the first set of memory if the verifying was successful, the page table comprising correspondences between virtual memory and virtualized physical memory.

5. The computing device of claim 1, wherein a large page is 2 MB and a huge page is 1 GB.

6. The computing device of claim 1, wherein the computing device writes a known safe pattern of data to remaining available memory in the first memory slab.

7. The computing device of claim 6, wherein writing of the known safe pattern of data is part of the allocating the first memory slab.

8. The computing device of claim 6, wherein the known safe pattern of data comprises no-op instructions.

9. The computing device of claim 1, wherein the computing device performs steps comprising:
determining that a first set of memory into which a first set of code and/or data was loaded has a second set of memory access permissions that differ from the first set of memory access permissions, the first set of memory being within the first memory slab;
allocating a second memory slab associated with the second set of memory access permissions, the second memory slab being coextensive with either a second large page in the SLAT or a second huge page in the SLAT;
loading the first set of code and/or data into a second set of memory within the second memory slab; and
removing the first set of code and/or data from the first set of memory.

10. The computing device of claim 1, wherein the allocating the first memory slab comprises generating a first entry in a slab table, the first entry identifying the first set of memory access permissions and a memory range of the first large page or the first huge page in the SLAT with which the first memory slab is coextensive.

11. The computing device of claim 1, wherein the slab allocator process performs the allocating of the first memory slab as part of a pre-allocation of multiple memory slabs, co-extensive with multiple large pages or multiple huge pages in the SLAT, each of the pre-allocated multiple memory slabs being associated with differing sets of memory access permissions.

12. The computing device of claim 11, wherein the differing sets of memory access permissions comprise both default read, write and execute permissions and non-default memory access permissions, the non-default memory access permissions comprising one of: (1) only read and execute permissions, (2) only read permissions or (3) no access permissions.

13. The computing device of claim 1, wherein the computing device performs steps comprising:
preventing demand-paging for a first range of memory encompassed by the first memory slab.

14. The computing device of claim 1, wherein the slab allocator process performs further steps comprising:
determining that the first set of memory access permissions are expected to be set for a first memory into which a first data will be stored, the first data comprising at least one of:
executable code or readable data; and
identifying a first available memory in the first memory slab into which the first data is to be stored based on the determining that the first set of memory access permissions with which the first memory slab is associated are expected to be set for the first memory into which the first data is stored.

15. The computing device of claim 14, wherein the slab allocator process performs further steps comprising:
allocating a second memory slab associated with a second set of memory access permissions, the second memory slab being coextensive with either a second large page in the SLAT or a second huge page in the SLAT;
determining that the second set of memory access permissions are expected to be set for a second memory into which a second data will be stored, the second data comprising at least one of: executable code or readable data; and
identifying a first available memory in the second memory slab into which the second data is to be stored based on the determining that the second set of memory access permissions with which the second memory slab is associated are expected to be set for the second memory into which the second data is stored;
wherein unutilized memory space exists between an end of the first data as stored in the first memory slab and a beginning of the second data as stored in the second memory slab.

16. A method of increasing a speed of access of computer memory, the method comprising:
executing, on a computing device, a hypervisor, the hypervisor performing steps comprising:
receiving a first memory access directed to a first set of virtualized physical memory;
identifying a first set of actual physical memory, provided by RAM of the computing device, that corresponds to the first set of virtualized physical memory by traversing multiple hierarchical levels of tables of a Second Layer Address Table (SLAT) maintained by the hypervisor; and
enabling the first memory access to the first set of actual physical memory; and
executing, on the computing device, a slab allocator process, the slab allocator process performing steps comprising:
allocating a first memory slab associated with a first set of memory access permissions, the first memory slab being coextensive with either a first large page in the SLAT or a first huge page in the SLAT, wherein:
the first large page is a first range of memory sized to encompass ranges of memory in a first table at one hierarchical level above a hierarchically lowest level of the multiple hierarchical levels of tables;
the first huge page is a second range of memory sized to encompass ranges of memory in a second table at least two hierarchical levels above the hierarchically lowest level of the multiple hierarchical levels of tables; and
the traversing the multiple hierarchical levels of tables of the SLAT comprises identifying the first set of actual physical memory without reference to any table in the hierarchically lowest level of tables of the SLAT because the first memory slab is coextensive with either the first large page or the first huge page in the SLAT.

17. The method of claim 16, further comprising:
determining that a first set of memory into which a first set of code and/or data was loaded has a second set of memory access permissions that differ from the first set of memory access permissions, the first set of memory being within the first memory slab;
allocating a second memory slab associated with the second set of memory access permissions, the second memory slab being coextensive with either a second large page in the SLAT or a second huge page in the SLAT;
loading the first set of code and/or data into a second set of memory within the second memory slab; and
removing the first set of code and/or data from the first set of memory.

18. The method of claim 16, wherein the executing of the slab allocator process performs the allocating of the first memory slab as part of a pre-allocation of multiple memory slabs, co-extensive with multiple large pages or multiple huge pages in the SLAT, each of the pre-allocated multiple memory slabs being associated with differing sets of memory access permissions.

19. The method of claim 16, wherein the executing of the slab allocator process performs further steps comprising:
determining that the first set of memory access permissions are expected to be set for a first memory into which a first data will be stored, the first data comprising at least one of:
executable code or readable data; and
identifying a first available memory in the first memory slab into which the first data is to be stored based on the determining that the first set of memory access permissions with which the first memory slab is associated are expected to be set for the first memory into which the first data is stored.

20. One or more computer-readable storage media comprising computer-executable instructions, which when executed, cause a computing device to:
execute a hypervisor, of the hypervisor causing the computing device to perform steps comprising:
receiving a first memory access directed to a first set of virtualized physical memory;
identifying a first set of actual physical memory, provided by RAM of the computing device, that corresponds to the first set of virtualized physical memory by traversing multiple hierarchical levels of tables of a Second Layer Address Table (SLAT) maintained by the hypervisor; and
enabling the first memory access to the first set of actual physical memory; and execute a slab allocator process, the slab allocator process causing the computing device to perform steps comprising:

allocating a first memory slab associated with a first set of memory access permissions, the first memory slab being coextensive with either a first large page in the SLAT or a first huge page in the SLAT, wherein:

the first large page is a first range of memory sized to encompass ranges of memory in a first table at one hierarchical level above a hierarchically lowest level of the multiple hierarchical levels of tables;

the first huge page is a second range of memory sized to encompass ranges of memory in a second table at least two hierarchical levels above the hierarchically lowest level of the multiple hierarchical levels of tables; and the traversing the multiple hierarchical levels of tables of the SLAT comprises identifying the first set of actual physical memory without reference to any table in the hierarchically lowest level of tables of the SLAT.

* * * * *